Sept. 20, 1932.   W. H. HOPPE ET AL   1,877,876
CONTROL APPARATUS FOR POWER OPERATED SWITCH MACHINES
Filed Aug. 12, 1930
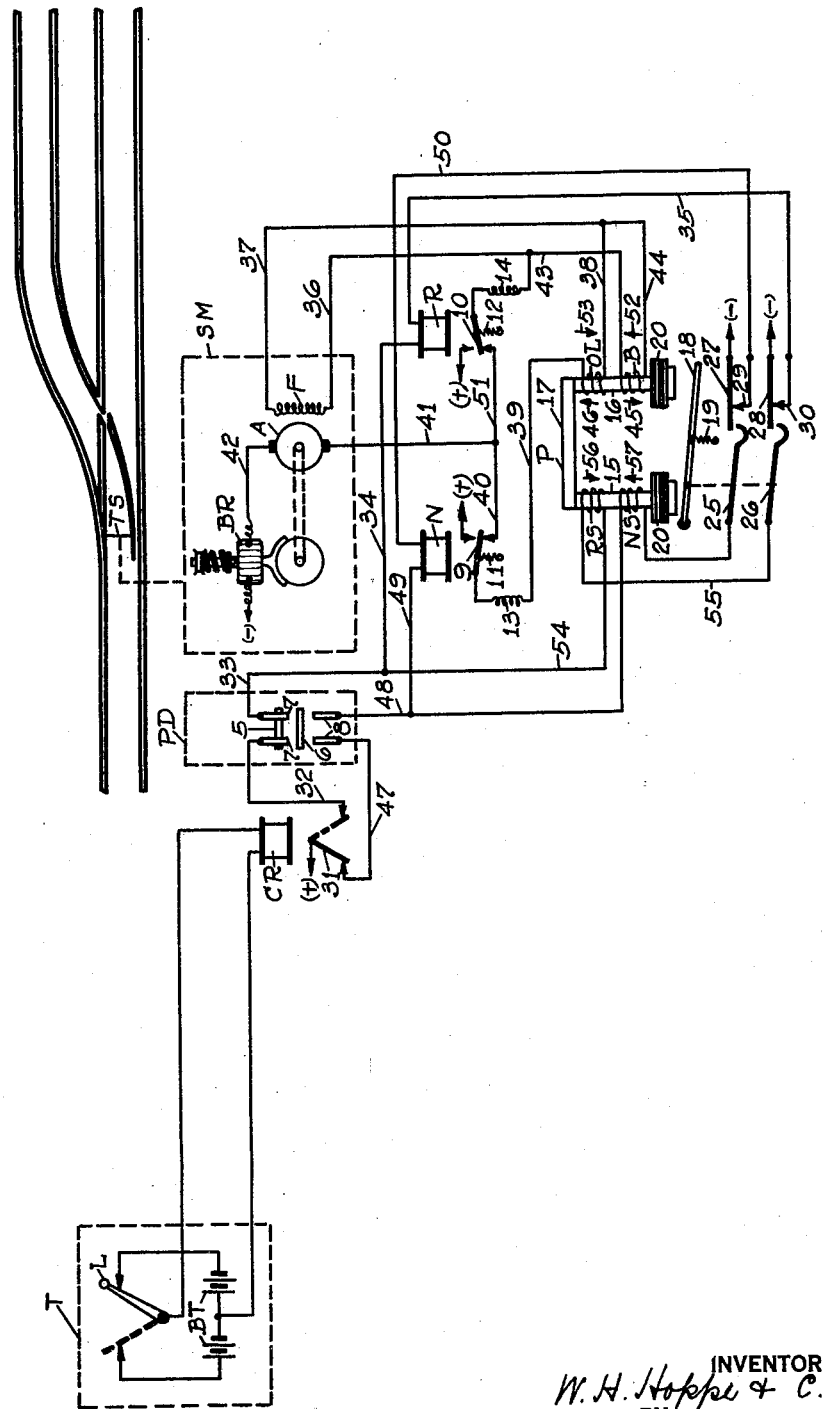
INVENTORS
W. H. Hoppe & C. L. Swanton,
BY Neil D. Preston,
their ATTORNEY Patented Sept. 20, 1932

1,877,876

UNITED STATES PATENT OFFICE

WALTER H. HOPPE, OF ROCHESTER, AND CHARLES L. SWANTON, OF CHURCHVILLE, NEW YORK, ASSIGNORS TO GENERAL RAILWAY SIGNAL COMPANY, OF ROCHESTER, NEW YORK

CONTROL APPARATUS FOR POWER OPERATED SWITCH MACHINES

Application filed August 12, 1930. Serial No. 474,758.

This invention relates to systems for operating railroad track switches, and more particularly pertains to overload devices and means employed to protect electrically operated switch machines used in such systems.

Although the electric motor of a power operated switch machine should be designed to operate under normal load conditions and such overload conditions that are of short duration, it should be protected against a continuous overload. The current flow in the motor windings of such a switch machine, during starting conditions and during the reversal of the switch machine in mid stroke, is sometimes greater in value than when a continuous overload condition exists. Thus, in providing overload protective means which is actuated in accordance with the current flow through the motor windings, it is necessary to provide means which differentiates or distinguishes between large values of current due to starting conditions and the like, and similar values of current due to overload conditions of a harmful nature.

In accordance with the present invention, it is proposed to provide overload protective means for electric motors employed with power driven switch machines, which means is responsive to the current flow in the motor windings so as to remove power from the motor when excessive current flows therein, but which means utilizes the inherent characteristics of starting conditions and the like to prevent its actuation.

By way of explanation and without attempting to define the scope of the present invention, it may be stated that the flow of current in a motor circuit upon the initial closing thereof, is dependent upon the resistance of the circuit, the inductance of the circuit, and the response of the motor armature to the current flow therein; while in the case of an overload occurring during operation of the motor, the current flow in the motor circuit is dependent upon the resistance of the circuit and the response of the motor armature to the current flow therein. Thus, the field winding of the motor, which is highly inductive, will have a potential drop across it including a reactance drop and a resistance drop when starting conditions are present, but if an overload occurs during operation of the motor, the potential drop across the field winding will include practically the resistance drop alone.

In view of the above, the present invention proposes to provide an overload protective device which employs the additional reactance potential drop across the field winding in the case of starting conditions to prevent actuation of the protective device, although the same current flowing through the motor circuit in the case of an overload occurring during operation, actuates the device to thereby open the supply of power to the motor.

It is further proposed in accordance with the present invention, to provide means which co-acts with the overload protective device in a manner to maintain it in an actuated condition until the operator at some remote point endeavors to accomplish the opposite operation of the associated switch machine.

Other objects, purposes and characteristic features of the present invention will be in part obvious from the accompanying drawing and in part pointed out as the description thereof progresses.

In describing the present invention, reference will be made to the accompanying drawing which illustrates in a diagrammatic manner one embodiment of the present invention as applied to the control of a single railway track switch.

With reference to the accompanying drawing, a railroad track switch TS is illustrated as operated by a switch machine SM which may be of any suitable type, such for example as shown in the patent to W. K. Howe, Patent No. 1,466,903, dated September 4, 1923. This switch machine is provided with the usual armature A and field winding F having associated therewith a brake BR of any suitable type, such for example as shown in the pending application of W. K. Howe, Ser. No. 399,547, filed October 14, 1929. The brake BR is of the spring biased type having its braking member normally engaged in a manner to prevent rotation of the armature A, but is actuated to release the armature when the normal operating current flows through the armature windings which are connected in series with the windings of the brake.

Associated with the switch machine SM is a group of contacts commonly called point detector contacts including movable contact members 5 and 6 which make contact between their respective pairs of fixed contacts. Movable contact 5 makes contact between fixed contacts 7 when in normal and intermediate positions, while the movable contact 6 makes contact between fixed contacts 8 when in reverse and intermediate positions. These movable contacts 5 and 6 are operated to either normal or reverse extreme positions in correspondence with the track switch TS when it is locked, and are operated to intermediate positions at any time the track switch TS is unlocked. Any suitable type mechanism may be employed for operating these contacts jointly from the operation of the track switch TS and the switch machine SM, one suitable mechanism being shown for example in the patent to C. S. Bushnell, Patent No. 1,516,236, dated November 25, 1924.

At the switch machine, normal and reverse circuit controllers N and R are respectively provided for causing the switch machine to operate the track switch TS to normal or reverse positions respectively. These normal and reverse circuit controllers N and R have movable contacts 9 and 10 respectively, which contacts are biased to deenergized positions by their respective coil springs 11 and 12. The contacts 9 and 10 each have located adjacent thereto, the blow-out coils 13 and 14 respectively. These blow-out coils produce magnetic flux which passes between the respective contact points in a manner to extinguish any electric arc which is created by the opening of the circuit during the flow of a comparatively heavy current, for reasons well understood.

A protective device P is provided having two core members 15 and 16 interconnected at one end by a back strap 17 and interconnected at the opposite end by an armature 18. The armature 18 is suitably pivoted and biased to an extreme position by a coil spring 19, so that when the magnetic structure including the core members 15 and 16 interconnected by the back strap 17, is deenergized, the armature 18 normally assumes a deenergized position. The tension on the biasing spring 19 is preferably arranged to be adjustable so as to enable the pick-up value of the armature 18 to be changed as desired. The protective device P is provided with an overload coil OL, a bucking coil B, and normal and reverse stick coils NS and RS respectively. Also, a number of choke rings or short circuited windings 20 are located at the lower extremities of the core members 15 and 16. In this connection, it is noted that the bucking coil B on the core member 16 is preferably located next to the choke rings 20 for reasons hereinafter pointed out.

The protective device P is provided with suitable movable contacts 25 and 26 which are operably attached to the armature 18 so as to be operated to corresponding deenergized and energized positions. Two spring biased contacts 27 and 28 are tensioned against fixed contacts 29 and 30, said contacts 27 and 28 having suitable extensions which are adapted to be engaged by the movable contacts 25 and 26 so as to make contact therewith respectively and to disengage their respective back contacts when the armature 18 is energized.

Located at a point local to the switch machine SM is a control relay CR, which may be any suitable polar type relay having two extreme biased positions. In other words, the control relay CR is of the type preferably having its contacts actuated to one or the other of two extreme positions depending upon the polarity applied to its energizing windings, with suitable means provided to maintain the contact structure in its last actuated position regardless of subsequent deenergization of the relay windings.

The relay CR is illustrated as being controlled over a polarized line extending from a central tower T in which is located a battery BT having a center tap and arranged to supply energy to the control relay CR in accordance with the position of a control lever L. Although this simple arrangement has been shown as one manner for governing the control relay CR over a polarized line, it is to be understood that various other means may be employed without in any way departing from the present invention.

It is believed that various functions of the present invention, characteristic features and purposes thereof will be best understood by a detailed description of the operation of the system which is shown as one embodiment of the present invention.

*Operation of the system*

Let us assume that the operator in the tower T desires to operate the track switch TS from the normal position (as shown) to the reverse position. To do this, he moves the lever L to its left hand dotted line position reversing the polarity of the current supplied to the windings of the relay CR in a manner obvious from the drawing. With current flowing in the reverse direction through the windings of the relay CR, the contact 31 is operated to its right hand dotted line position in which the energizing circuit for the reverse circuit controller R is completed from the positive terminal of a suitable source of electrical potential indicated as (+), through polar contact 31 in its right hand position, wire 32, contacts 7—5, wires 33 and 34, winding of reverse circuit controller R, wire 35, fixed contact 30, spring biased contact 28, to the opposite terminal of the suitable source indicated as (—).

The energization of the reverse circuit controller R actuates its contact 10 to an energized position completing the reverse operating circuit of the switch machine motor from the positive terminal of a suitable source of electrical potential indicated as (+), through front contact 10 of reverse circuit controller R, blow-out coil 14, wire 36, field winding F, wires 37 and 38, overload coil OL, wire 39, blow-out coil 13, back contact 9 of normal circuit controller N, wires 40 and 41, windings of armature A, wire 42, windings of brake BR, to the opposite terminal of the suitable source indicated as (—).

The application of potential to the reverse operating circuit causes a change in flux value in the core members of the switch machine motor for reasons well understood. The rate of change of the flux value in the field core structure is greatest upon the initial closure of the circuit which change causes a counter-electro-motive force or potential to be created in the field winding. This counter-electro-motive force opposes the flow of current therein in accordance with the natural phenomena of inductive circuits. As the field winding includes a greater amount of inductive reactance than the rest of the operating circuit, there is a potential drop across the field winding of a value substantially equal to the applied potential. This potential drop across the field winding decreases as the rate of change of flux in the field core structure decreases, until ultimately a value is reached which is practically dependent only upon the resistance of the field winding and the current flowing therethrough.

In view of the above, upon the initial closure of the reverse operating circuit, substantially the full potential of the energizing source is applied to the differentiating or bucking coil B of the overload device P through a circuit from the positive terminal of a suitable source indicated as (+), through front contact 10 of reverse circuit controller R, blow-out coil 14, wire 43, bucking coil B, wires 44 and 38, overload coil OL, wire 39, blow-out coil 13, back contact 9 of normal circuit controller N, wires 40 and 41, windings of armature A, wire 42, windings of brake BR, to the opposite terminal of the suitable source indicated as (—).

Thus, a current flows in the bucking coil B which reaches a maximum value almost immediately upon the closure of the reverse operating circuit, thereafter dying down to a normal value as above pointed out. This current flow in the bucking coil B produces a magnetic flux in the core structure of the protective device having a polarity of direction of flow indicated by the arrow 45. However, the maximum value of this flux in the core structure is made to lag its current a sufficient amount to be substantially in time phase with the maximum value of flux produced by the operating current flowing in the overload coil OL during starting conditions by employing the choke rings 20.

The initial current flowing in the reverse operating circuit of the switch machine motor is dependent (as heretofore pointed out) upon the resistance of the operating circuit, the inductance of the circuit, and the response of the motor armature to the current flow therein. As the inductive reactance of the circuit becomes less and less effective to limit the flow of current therein, current then flows in accordance with the resistance of the circuit and the response of the motor armature. Thus, the initial current flow is of a relatively large value prior to the response of the motor armature and flows through the reverse operating circuit including the overload coil OL and the windings of the brake BR. The braking member of the brake BR is actuated by this current flow to a non-engaging position allowing the motor armature A to respond. The rotation of the armature A creates a counter-electro-motive force which reduces the current in the operating circuit to the normal or usual operating value.

The initial surge of operating current in flowing through the overload coil OL produces a magnetic flux in the core structure of the protective device P having a direction indicated by the arrow 46. The maximum value of this flux is substantially in time phase with its current inasmuch as the choke rings 20 have but a slight effect upon the rise of this flux due to their location in respect to the coil OL. However, as the fluxes produced by the coils OL and B are in opposite directions as indicated by the arrows 46 and 45 respectively, and as the maximum values of these fluxes are substantially in time phase with each other, the net value of flux passing through the magnetic structure of the protective device P including the armature 18 is practically zero.

In other words, the surge of current in the motor operating circuit under starting conditions is prevented from actuating the armature 18 to an energized position by employing the inductive reactance potential drop across the field winding to energize the bucking coil B in a manner to neutralize or buck the flux produced by the excessive current flowing through the overload coil OL. As the resultant or net value of flux passing through the armature 18 is of a value insufficient to actuate it to an energized position, the switch machine motor passes through the abnormal conditions of starting to the normal conditions of operation of the switch machine. It is to be understood, that after the inductive effect of the field winding F has been passed, and the motor armature is normally rotating under normal load conditions, the current which flows in the bucking coil B is only of a value in accordance with the resistance potential drop across the field winding, which value is practically negligible in respect to the operating current flow in the overload coil OL.

The rotation of the armature A causes the track switch TS to be unlocked and operated toward its reverse locked position. When the track switch TS is unlocked, the movable contacts 5 and 6 of the point detector mechanism are operated to intermediate positions to provide for the reversibility of the switch machine in mid stroke, and hereinafter pointed out.

Let us assume that the switch machine SM continues operation until the track switch TS is operated to an extreme reverse locked condition in response to the control of contact 31 to a right hand position. As soon as the track switch TS is in a reverse locked position, the movable contacts 5 and 6 are operated to extreme reverse positions in which the energizing circuit of the reverse circuit controller R is opened at contacts 7—5. Thus, the reverse circuit controller R is deenergized opening the reverse operating circuit of the motor at front contact 10. The deenergization of the reverse operating circuit causes the windings of the brake BR to be deenergized which allows the braking member of the brake to assume an engaging position such as to immediately bring the armature A to rest. The brake BR also serves to hold the armature A in its last operated position until an operating circuit is again energized.

It is to be understood that the operation of the track switch from the reverse position to the normal position is merely an inverse function of the operation already described and will not be pointed out in detail.

For convenience we will assume that the switch machine SM is in mid stroke operating the track switch TS to a reverse position in a manner as above explained, and that sometime prior to the completion of its operation the operator returns the control lever L to its normal position resulting in the operation of the contact 31 to its left hand position. Such operation results in the reversal of the switch machine in a manner to return the track switch to its normal position without completion of the original operation initiated.

With the contact 31 in its left hand position, the energizing circuit of the reverse circuit controller R is opened so that its contact 10 assumes its biased deenergized position. This deenergization of the motor causes the flux in the motor core structure to collapse or die out which again produces an electro-motive force in the field winding in a direction the same as the current previously flowing therein. This creates a surge of current in the bucking coil B of the protective device to produce a flux in the core structure of the protective device P having a direction indicated by the arrow 45. As this surge of current is of short duration, the choke rings 20 prevent the actuation of the armature 18.

With the contact 31 of the control relay CR in its left hand position, the normal circuit controller N is energized from the positive terminal of the suitable source indicated as (+), through contact 31 in its left hand position, wire 47, contacts 8—6, wires 48 and 49, winding of normal circuit controller N, wire 50, fixed contact 29, spring biased contact 27, to the opposite terminal of the suitable source indicated as (−). This energization of the normal circuit controller N actuates its contact 11 to an energized position closing the normal operating circuit of the switch machine motor from the positive terminal of a suitable source of electrical potential indicated as (+), through front contact 9 of normal circuit controller N, blow-out coil 13, wire 39, overload coil OL, wires 38 and 37, field winding F, wire 36, blow-out coil 14, back contact 10 of reverse circuit controller R, wires 51 and 41, windings of armature A, wire 42, windings of brake BR, to the opposite terminal of the suitable source indicated as (−).

The application of potential to the normal operating circuit of the switch machine motor also causes a surge of current above the normal operating value until the motor armature has reversed its direction of rotation and operates in a manner to return the track switch TS to a normal position. But the initial application of potential to the normal operating circuit causes a counter-electro-motive force to be produced in the field winding F as heretofore explained. Thus, a reactance potential drop is produced across the field winding which causes a surge of current to flow in the bucking coil B from the positive terminal of a suitable source of electrical potential indicated as (+), through front contact 9 of normal circuit controller N, blow-out coil 13, wire 39, overload coil OL, wires 38 and 44, bucking coil B, wire 43, blow-out coil 14, back contact 10 of reverse circuit controller R, wires 51 and 41, windings of armature A, wire 42, windings of brake BR to the opposite terminal of the suitable source indicated as (−).

The direction of this current flow in the bucking coil B produces a flux in the core structure of the protective device P in a direction indicated by an arrow 52. Although this current reaches a maximum value prior to the maximum value reached by the surge of current in the normal operating circuit, the flux produced thereby is retarded or caused to lag a sufficient time by reason of the choke rings 20 to be in time phase with the maximum flux value produced by the surge of operating current flowing in the overload coil OL. The direction of flux produced by the operating current in the overload coil OL is indicated by an arrow 53. Thus, it is obvious that the fluxes produced by the coils OL and B are in opposite directions the same as when the track switch TS is started from an extreme position. The net difference between the two fluxes is insufficient to actuate the armature 18 to an energized position. It is to be understood in this connection that while the motor normally operates, the potential drop across the field winding is dependent upon the resistance of the winding and the current flowing therethrough. Under normal operating conditions after the motor armature is rotating, the differentiating or bucking coil B receives such a low value of current as to be practically negligible in respect to the current flowing in the overload coil OL.

In this connection, it is noted that the direction of current in the bucking coil B due to the collapse of the flux in the field core structure upon the opening of the reverse operating circuit, is in such a direction as to produce a flux in the core member 16 having a direction indicated by the arrow 45. The flux produced by the operating current flowing in the normal operating circuit is in a direction indicated by the arrow 53. In other words, the current in the bucking coil B due to the collapse of field flux is such as to bring the flux value in the core 16 substantially to zero or at least it is effective in such a direction that it is additive in respect to the flux produced by an excessive current occurring upon the closure of the normal operating circuit. This then makes the protective device more responsive to an overload, or it may be otherwise stated by saying that the system is arranged to operate on the side of safety.

Let us assume that the switch machine is operating the track switch to a reverse position in a manner above explained. Under such conditions, the flux produced by the operating current in the overload coil OL has a direction indicated by the arrow 46, while the flux produced by the bucking coil B due to the current flowing therein by reason of the resistance drop across the field winding has a direction indicated by the arrow 45. If for some reason an overload is now placed upon the switch machine motor, the speed of the armature A is reduced so that an increased current flows therein in order to obtain torque sufficient to carry the load. This increase in current is of course reflected in the overload coil OL which produces a greater flux value in the magnetic structure of the protective device P. The increase in current in the operating circuit also creates a greater resistance potential drop across the field winding F which in turn causes an increase of current in the bucking coil B. However, the increase of flux due to the increase of current in the bucking coil B is relatively small in proportion to the increase in flux due to the increase in current of the overload coil OL. If the overload applied to the motor is sufficiently great the net difference between the flux produced by the respective coils OL and B is sufficient to actuate the armature 18 to an energized position.

Preferably the armature 18 is actuated to an energized position when a predetermined net value of flux flows through the magnetic structure of the protective device P. This net value is such as to make certain that the current in the overload coil OL (operating circuit of the motor) is below a predetermined undesirable value. The value of net flux which will actuate the armature 18 may be predetermined or altered by adjusting the air-gap between the armature 18 and the respective core members 15 and 16 or by increasing or decreasing the tension on the coil spring 19.

The actuation of the armature 18 to an energized position causes the movable contacts 25 and 26 to be moved to engage with the spring contacts 27 and 28 respectively. When the contact 26 makes connection with the spring biased contact 28, it closes the reverse stick circuit for the protective device P maintaining the armature 18 in an energized position. This reverse stick circuit is traced from the positive terminal of a suitable source of electrical potential indicated as (+), through contact 31 of control relay CR in its right hand position, wire 32, contacts 7—5, wires 33 and 54, reverse stick coil RS, wire 55, movable contact 26, spring biased contact 28, to the opposite terminal of the suitable source indicated as (—).

Also, the actuation of the movable contact 26 to an energized position causes the spring biased contact 28 to disengage fixed contact 30 opening the energizing circuit of the reverse circuit controller R which in turn de-energizes the reverse operating circuit of the switch machine motor at front contact 10 thereof. Although this current may be relatively large due to the overload condition, any arc which is created at front contact 10 is immediately extinguished due to the magnetic flux produced by the current flow in the blow-out coil 14.

It is noted that the flux produced by the current in the reverse stick winding RS is in a direction indicated by the arrow 56. It is obvious that the flux produced by current in the stick coil is additive in respect to the flux produced in the overload coil OL indicated by the arrow 46.

It is to be understood, that when the normal operating circuit is closed, the operating current flowing through the overload coil OL is in the opposite direction which produces a flux having a direction indicated by arrow 53 in which case, if the protective device P is actuated in response to an overload, the stick coil NS is energized producing a flux having a direction indicated by the arrow 57 which is additive with the flux produced by the overload coil OL.

As the stick circuits are completed before the respective energizing circuits of the normal and reverse circuit controllers N and R are opened and as the fluxes produced by the corresponding coils are additive, the armature is insured of reaching an energized position when once initiated from a deenergized position.

When the overload protective device P has been actuated during a particular operation (either normal or reverse), the movable contacts 5 and 6 of the point detector mechanism PD are in intermediate positions, so that the reversal of the control relay CR by the operator opens the stick circuit previously closed and closes the opposite stick circuit. Should insufficient time be consumed between the deenergization of a particular stick coil for the corresponding operation and the energization of the opposite stick coil, no harmful result is produced. In fact, the drop away of the armature 18 is insured by reason of the fact that the fluxes produced by the two stick coils are in opposite directions, which necessitates that the net flux value in the core structure of the protective device P must pass through a zero value causing the armature 18 to assume its deenergized position opening both stick circuits.

Thus, in accordance with the present invention, an overload protective device has been provided in connection with the remote control of a railroad track switch which adequately distinguishes starting conditions and the like from overload conditions of a harmful nature. The overload protective device, constructed in accordance with the present invention, utilizes the characteristics of starting conditions by employing the relatively high inductance of the switch machine motor field winding. This is a distinct advantage in that greater regulation of the operation of the protective device may be obtained as the current flowing in the bucking winding B is conductive and may be adjusted by varying the resistance in the circuit. In other words, the characteristics of the protective device P may be altered or adjusted by changing the number of choke rings 20, the air-gap between the armature 18 and the core members 15 and 16, the tension of the coil spring 19 or the resistance of the circuit including the bucking coil B. The employing of the inductance of the field winding also reduces to a great extent the size of the overload protective device P.

Having thus described a switch machine control circuit as one specific embodiment of the present invention, it is desired to be understood that this particular form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appended claims.

Having described our invention, we now claim:—

1. In combination, a direct current motor having an armature winding and a field winding, a source of direct current potential, means for energizing said motor from said source, an overload protective device associated with said motor effective to deenergize said motor upon excessive current flow therein, and a means automatically preventing said overload device from becoming effective to deenergize said motor upon the initial operation of said energizing means.

2. In combination, a direct current motor having an armature winding and a field winding, a source of direct current potential, means for energizing said motor from said source, an overload protective device associated with said motor effective to deenergize said motor upon excessive current flow therein, and means preventing said overload device from becoming effective during a surge of current in said motor only if said surge creates therein a counter electro-motive force substantially equal to the potential of said energizing means.

3. In combination, a direct current motor having an energizing circuit, an inductive reactor included in said energizing circuit, and an overload protective device having an overload winding and a differentiating winding, said overload winding being connected in series in said energizing circuit and said differentiating winding connected in multiple with said inductive reactor, said windings so associated as to produce magnetic fluxes opposing each other, whereby the current flow in said differentiating winding is dependent upon the potential drop across said inductive reactor, and whereby said overload protective device is not actuated upon the initial closure of said energizing circuit of said motor while said motor is at rest.

4. In combination, a direct current motor having an armature and a field, and an overload device having an overload coil connected in series with said armature and having a bucking coil connected in multiple with said field, said overload coil and said bucking coil being differentially connected.

5. In combination, a direct current motor having an armature and a series field, and an overload device having an overload coil connected in series with said armature and having a bucking coil connected in multiple with said field, said overload coil and said bucking coil being differentially connected, and means maintaining said overload device actuated after an overload occurs until manually restored.

6. In combination, a translating device, a control circuit for said translating device, an inductive reactor connected in series in said control circuit, an overload protective device for said control circuit having an overload coil connected in series therein, and a bucking coil differentially associated with said overload coil, said bucking coil being connected in multiple with said inductive reactor.

7. In a control system for railroad track switches, a track switch, a switch machine having an electric motor, normal and reverse operating circuits for said motor, an inductive reactor in said operating circuits, manually operable means governing said operating circuits, an overload protective device having an overload coil and a bucking coil, said overload coil being connected in series with said operating circuits, and said bucking coil being connected in multiple with said inductive reactor so as to have an inverse relationship in respect to said overload coil, and means maintaining said overload protective device actuated after an overload occurs until said manually operable means has been manually controlled.

8. In combination, a motor having operating circuits, an overload protective device for opening said operating circuits, said device having a means responsive to all abnormal current conditions in said operating circuits, and a means substantially responsive only to transient current conditions in said operating circuits.

9. In combination, a motor having operating circuits, an overload responsive means effective to open said operating circuits upon excessive current flow therein, and a transient current responsive means effective to prevent opening of said operating circuits by said overload responsive means only during transient current conditions in said operating circuits.

10. In combination, a motor having operating circuits, a source of potential, governing means for energizing said operating circuits from said source of potential, an overload means effective to deenergize said motor upon excessive current flow in said circuits, means maintaining said motor deenergized subsequent to a deenergization by said operating means until operation by said governing means, and means automatically preventing said overload means from becoming effective to deenergize said motor upon initial operation of said governing means.

11. In combination, a motor having operating circuits, a source of potential, a governing means for energizing said motor from said source of potential through said operating circuits, overload means for opening said operating circuits upon the flow of excessive current therein, and a means responsive to the rate of change in current flow in said operating circuits for preventing operation of said overload means.

12. In a control system for railroad track switches, a track switch, a switch machine for operating said track switch, an electric motor for operating said switch machine, said motor having armature and field windings, operating circuits for said armature and field windings, and an overload protective device associated with said motor, said device having an overload coil and a bucking coil, said overload coil being connected in series in said operating circuits with said armature and field windings, and said bucking coil being connected in multiple with said field winding.

13. In a control system for railroad track switches, a track switch, a switch machine for operating said track switch, an electric motor for operating said switch machine, said motor having armature and field windings, a manually operable control lever, a control relay governed by said control lever, point detector contacts, normal and reverse circuit controllers, an overload protective device having an overload and a bucking coil, circuits for said normal and reverse circuit controllers governed by said control relay, said point detector contacts and said overload protective device, normal and reverse operating circuits for said motor governed by said normal and reverse circuit controllers respectively and including said armature and field windings and said overload coil of said protective device, means connecting said bucking coil of said overload protective device in multiple with said field winding, and means maintaining said overload protective device operated until said control relay is governed to a new position by said control lever.

14. In combination, a motor having armature and field windings, normal and reverse operating circuits for said motor armature and field windings, means manually operable for governing said normal and reverse operating circuits, and a device for opening said normal and reverse operating circuits upon excessive current flow therein, said device having an overload coil connected in series in said normal and reverse operating circuits, having a bucking coil connected in multiple with said field winding, and having two stick windings one or the other of which is effective to maintain said device operated until a new operation of said manually controllable means for governing said normal and reverse operating circuits.

In testimony whereof we affix our signatures.

WALTER H. HOPPE.
CHARLES L. SWANTON.